United States Patent
Kataoka (10) Patent No.: US 9,842,265 B2
(45) Date of Patent: Dec. 12, 2017

(54) MARKING LINE DETECTION SYSTEM (71) Applicant: TOYOTA JIDOSHA KABUSHIKI KAISHA, Toyota-shi, Aichi-ken (JP)

(72) Inventor: Yusuke Kataoka, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 14/642,039

(22) Filed: Mar. 9, 2015

(65) Prior Publication Data
US 2015/0262020 A1 Sep. 17, 2015

(30) Foreign Application Priority Data

Mar. 12, 2014 (JP) .................................. 2014-049193

(51) Int. Cl.
*G06K 9/00* (2006.01)

(52) U.S. Cl.
CPC .............. *G06K 9/00798* (2013.01); *G06T 2207/30256* (2013.01)

(58) Field of Classification Search
CPC ................................................. G06K 9/00798
See application file for complete search history.

(56) References Cited

U.S. PATENT DOCUMENTS

2012/0327233 A1* 12/2012 Imai ...................... G06T 7/0042
348/148

FOREIGN PATENT DOCUMENTS

EP          1 603 097 A2    12/2005
JP          2012-022574 A    2/2012

* cited by examiner

*Primary Examiner* — Utpal Shah
(74) *Attorney, Agent, or Firm* — Sughrue Mion, PLLC (57) ABSTRACT

A marking line detection system includes an imaging device, a marking line candidate detection unit, a marking line correction unit, a center line determination unit and a validity determination unit. The marking line candidate detection unit detects first and second vehicle's marking line candidates. The marking line correction unit corrects a position of the second vehicle's marking line candidate based on a position of the first vehicle's marking line candidate. When the first vehicle's marking line candidate is the valid center line, the marking line correction unit performs a correction of the position of the second vehicle's marking line candidate based on the position of the first vehicle's marking line candidate. When the first vehicle's marking line candidate is not the valid center line, the marking line correction unit does not perform the correction based on the position of the first vehicle's marking line candidate.

2 Claims, 8 Drawing Sheets

MARKING LINE DETECTION SYSTEM

INCORPORATION BY REFERENCE

The disclosure of Japanese Patent Application No. 2014-049193 filed on Mar. 12, 2014 including the specification, drawings and abstract is incorporated herein by reference in its entirety.

BACKGROUND OF THE INVENTION

1. Field of the Invention

The present invention relates to a marking line detection system that detects marking lines on the road surface around a vehicle.

2. Description of Related Art

Japanese Patent Application Publication No. 2012-022574 (JP 2012-022574 A) discloses a technology that detects the point groups of white-line candidate points from the white-line detection area on each of the right and left sides of a vehicle and, based on the detected point groups, calculates virtual white-line approximate lines on the right and left sides of the vehicle and determines parallelism between the two virtual white-line approximate lines. If it is determined that the parallelism is low, the technology calculates the approximation error of each of the two virtual white-line approximate lines, determines one of the virtual white-line approximate lines with the lower approximation error as a correct virtual white-line approximate line, and determines the other as an incorrectly recognized virtual white-line approximate line. After that, the technology offsets the virtual white-line approximate line on the correctly determined side to the incorrectly recognized side, compares the virtual white-line approximate line, which has been offset, with the incorrectly recognized virtual white-line approximate line and, then, corrects the position of the incorrectly recognized virtual white-line approximate line.

The technology according to Japanese Patent Application Publication No. 2012-022574 (JP 2012-022574 A) has the following problem. For example, assume that the main driving road and a branching road, which branches to the left and leads to an exit, are mixed on a highway. In such a case, if the approximation error of the virtual white-line approximate line on the left side of the vehicle is larger than the approximation error, of the virtual white-line approximate line on the right side, it is determined that the virtual white-line approximate line on the left side is incorrectly recognized. Therefore, the position of the virtual white-line approximate line on the left side is corrected based on the position of the virtual white-line approximate line on the right side that is determined as correct. This means that, even if the white line of a branching road is detected, this technology can detect the white line (marking line) of the main driving road without being affected by the white line of the branching road. However, if the white line on the right side of the vehicle is a broken line or is obscure due to a scrape, the approximation error of the virtual white-line approximate line on the right side is sometimes larger than the approximation error of the virtual white-line approximate line on the left side. In this case, the technology according to the Japanese Patent Application Publication No. 2012-022574 (JP 2012-022574 A) corrects the position of the virtual white-line approximate line on the right side based on the position of the virtual white-line approximate line on the left side that is the white line of the branching road, sometimes with the result that the white line (marking line) of the main driving road cannot be detected correctly.

SUMMARY OF THE INVENTION

The present invention provides a marking line detection system that can accurately detect the vehicle's marking lines in a main driving road where the main driving road and a branching road are mixed.

A marking line detection system according to an aspect of the present invention includes an imaging device, a marking line candidate detection unit, a marking line correction unit, a center line determination unit and a validity determination unit. The imaging device is configured to capture surroundings of a vehicle. The marking line candidate detection unit is configured to detect marking line candidates based on image information in an imaging area captured by the imaging device and is configured to, based on the marking line candidates, detect marking line candidates for a driving lane of the vehicle as vehicle's marking line candidates. The vehicle's marking line candidates include a first vehicle's marking line candidate and a second vehicle's marking line candidate. The marking line correction unit is configured to correct a position of the second vehicle's marking line candidate based on a position of the first vehicle's marking line candidate. The vehicle is positioned between the first vehicle's marking line candidate and the second vehicle's marking line candidate. The center line determination unit is configured to determine whether the first vehicle's marking line candidate is a center line. The validity determination unit is configured to, when the first vehicle's marking line candidate is determined as the center line by the center line determination unit, determine whether the first vehicle's marking line candidate is a valid center line. The valid center line is a center line to which a branching line of a branching road is not connected or a center line to which the branching line is less likely connected. The marking line correction unit is configured to, when the first vehicle's marking line candidate is determined as the valid center line by the validity determination unit, perform a correction of the position of the second vehicle's marking line candidate based on the position of the first vehicle's marking line candidate. The marking line correction unit is configured not to, when the first vehicle's marking line candidate is determined not to be the valid center line by the validity determination unit, perform the correction based on the position of the first vehicle's marking line candidate.

If at least one of the two vehicle's marking line candidates is a center line and the center line is a valid center line that is valid as the reference line, the marking line detection system in the aspect of the present invention corrects the position of the vehicle's marking line candidate, which is not the valid center line, based on the position of the valid center line. In the aspect of the present invention, the valid center line corresponds to the first vehicle's marking line candidate. Furthermore, the valid center line (reference line) mentioned here refers to a line (vehicle's marking line candidate) to which the branching line of a branching road is not connected or the branching line is less likely connected. Therefore, this marking line detection system avoids the correction of a vehicle's marking line candidate based on the branching line of a branching road, making it possible to correctly detect the marking lines of the driving lane of a vehicle.

In the aspect of the present invention, the marking line correction unit may be configured to, when the first vehicle's marking line candidate is determined not to be the valid center line by the validity determination unit, correct the position of the first vehicle's marking line candidate based on the position of the second vehicle's marking line candidate.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A marking line detection system in an embodiment of the present invention is described in detail below with reference to the drawings. The present invention is not limited to this embodiment.

The marking line detection system in the embodiment of the present invention is described with reference to FIG. 1 to FIG. 8.

Figure 1:
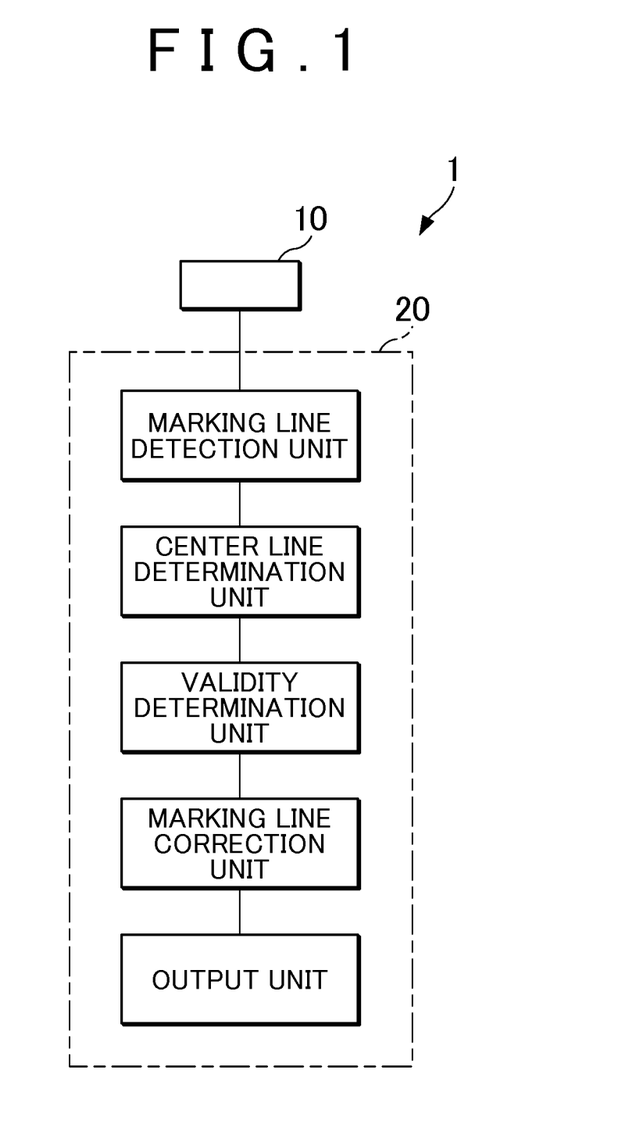
FIG. 1 is a diagram showing an example of a configuration of a marking line detection system in an embodiment of the present invention.

A marking line detection system 1 in this embodiment detects marking lines based on acquired surrounding information on the vehicle. A marking line mentioned in the embodiment of the present invention refers to a lane boundary line such as a white line or a yellow line on the road surface of the surroundings of the vehicle. A "yellow" line mentioned in this specification refers to a line that is stipulated by the Road Traffic Law of Japan as a line that indicates the prohibition of lane changing.

The marking line detection system 1 includes a surrounding information acquisition unit that acquires the surrounding information on the vehicle. The surrounding information acquisition unit is configured to acquire the vehicle's surrounding information for identifying the road surface, marking lines on the road surface, solid objects (other vehicles, buildings, etc.), and background (sky, etc.). In this embodiment, an imaging device 10 is used as the surrounding information acquisition unit. The imaging device 10 in the embodiment of the present invention is configured to capture the vehicle's surroundings and acquire image information, from which the identification information for identifying the road surface, marking lines on the road surface, solid objects, and background around the vehicle can be extracted, as the vehicle's surrounding information. The identification information refers to brightness value information extracted from the image information in the imaging area. The imaging device 10 captures an image at least in the traveling direction of the vehicle.

Although a stereo camera (imaging device 10) is used as the surrounding information acquisition unit in the embodiment of the present invention, a monocular camera, which works as the imaging device 10, may also be used as the surrounding information acquisition unit. In addition, the imaging device 10 may be a device that captures the image information as a monochrome image or as a color image.

The marking line detection system 1 includes a marking line detection electronic control unit (ECU) 20. The marking line detection ECU 20 is an electronic control device that performs arithmetic processing in the marking line detection system 1. The marking line detection ECU 20 includes a marking line detection unit. The marking line detection ECU 20 receives image information on the imaging area captured by the imaging device 10. The marking line detection ECU 20 detects marking lines using the marking line detection unit based on the image information on the imaging area.

Marking lines are detected from the image information by a method known in this technical field. For example, the marking line detection unit is divided into an information extraction unit, an edge point detection unit, an edge segment detection unit, and a marking line candidate detection unit.

The information extraction unit extracts brightness value information from the image information. The information extraction unit calculates the brightness value information by a method known in this technical field. For example, the information extraction unit in the embodiment of the present invention calculates the brightness value of each coordinate or each area of the image information based on the acquired image information. In calculating the brightness value information, scanning may be started at any point and performed in any direction in the image information. The information extraction unit extracts the brightness value information from the entire image information in the imaging area.

The edge point detection unit detects an edge point (a point where the brightness changes from dark to bright or from bright to dark) in the image information based on the brightness value information. An edge point is detected by a method known in this technical field.

For example, by using a differential filter (for example, a sobel filter) for the brightness value information in the image information, the edge point detection unit calculates the edge strength of a first edge point (rising edge point) and the edge strength of a second edge point (falling edge point). The brightness changes from dark (mainly, black) to bright (mainly, white or yellow) at the first edge point, and from bright to dark at the second edge point. That is, the edge point detection unit detects the first edge point and the second edge point that are thought of as the edge points of a marking line in the image information. The dark part corresponds mainly to the asphalt part on the road surface. On the other hand, the bright part corresponds mainly to the marking line on the road surface.

The edge point detection unit uses a threshold, which is compared with the edge strength, to exclude an edge point detected due to a factor other than a marking line such as a noise or a stain on the road surface. In addition, the edge point detection unit extracts first edge points and second edge points, each of which forms a pair, from the detected first edge points and the second edge points and, by doing so, excludes first edge points and second edge points, each of which does not form a pair and is isolated, assuming that those edge points are unnecessary. A pair of edge points refers to a pair of a first edge point and a second edge point detected from one marking line. To determine whether the edge points form a pair, the edge point detection unit uses the width between the first edge point and the second edge point and the brightness value information on the first edge point and the second edge point.

Based on all first edge points and second edge points selected as described above, the edge segment detection unit detects the following two types of segment. One is a segment composed of first edge points arranged in a straight form or a curved form (hereinafter called a "first edge segment"), and the other is a segment composed of second edge points arranged in a straight form or a curved form (hereinafter called a "second edge segment"). An edge segment is detected by a method known in this technical field.

For example, the edge segment detection unit performs the Hough transform processing for all first edge points and second edge points to detect first edge segments and second edge segments. After that, the edge segment detection unit calculates the parallelism or the distance for all detected first edge segments and second edge segments and, using the calculated result, extracts a first edge segment and a second edge segment that form a pair. A pair of edge segments refers to a set of a first edge segment and a second edge segment detected from one marking line. A first edge segment and a second edge segment, which form a pair, indicate the boundary of one marking line (each line when the marking line is a broken line).

The marking line candidate detection unit detects lines, each of which is thought of as a marking line (marking line candidates), in the image information, based on the first edge segments and the second edge segments each of which form a pair. In addition, the marking line candidate detection unit detects marking line candidates of the vehicle's driving lane from the marking line candidates as the vehicle's marking line candidates. The marking line candidates and the vehicle's marking line candidates are detected by a method known in this technical field.

For example, if the marking line candidate information, detected in the past, is not available when detecting a marking line candidate, the marking line candidate detection unit detects an area, surrounded by the first edge segment and the second edge segment newly detected as a pair, as the marking line candidate. In this case, the marking line candidate detection unit determines whether the area is a marking line candidate, considering the position, length, and slope of the first edge segment and the second edge segment in the image. On the other hand, if the marking line candidate information, detected in the past, is available, the marking line candidate detection unit extracts a pair of a first edge segment and a second edge segment similar to the marking line candidate information detected in the past. After that, the marking line candidate detection unit detects an area, surrounded by the first edge segment and the second edge segment, as the marking line candidate. The marking line candidate information detected in the past refers to one of the following types of information. One is the information on the marking line candidate or the marking line detected in a frame before the frame of the current image information, and the other is the information on the marking line candidate or the marking line detected when the vehicle traveled on the same road surface in the past.

The marking line candidate detection unit identifies an assumed area in the image information, where the vehicle's marking lines are assumed to be present, based on the vehicle' position in the image information and the lane width of the vehicle's driving lane in the image information and then selects marking line candidates, included in the identified assumed area, as the vehicle's marking line candidates. On the other hand, if marking line candidates are not detected in the identified assumed area, the marking line candidate detection unit determines that vehicle's marking line candidates are not detected in the identified assumed area. Note that there is a vehicle's marking line candidate on both of the right side and left side, or on only one of the right side and the left side, of the vehicle.

For the vehicle's position, the vehicle's position in the image information or the vehicle's position outside the frame of the image information is identified in advance based on the mounting position of the imaging device 10 and the imaging area. Similarly, for the lane width, the value according to the type of a road, such as a highway or a national road, is stored in advance in the storage unit of the marking line detection ECU 20. The marking line candidate detection unit determines the type of the road, on which the vehicle is traveling, based on the vehicle's position information provided by the car navigation system or the map information and reads the lane width according to the determined type of the road. The assumed area may be identified considering not only the vehicle's position and the lane width of the vehicle's driving lane but also the road surface shape of the vehicle's driving lane in the traveling direction. The road shape that should be considered in this case may be determined using the shape information on the marking line or the driving lane obtained according to the detection result of the vehicle's marking lines in the preceding process or may be determined using the shape information on the driving lane obtained based on the vehicle's position information from the car navigation system or the map information. The assumed area may be an area that is set in advance in the image information.

Based on the position of one of the two vehicle's marking line candidates detected on both sides of the vehicle, the marking line detection system 1 corrects the position of the other marking line candidate of the vehicle. More specifically, when the two vehicle's marking line candidates are detected, the marking line detection system 1 selects one of the vehicle's marking line candidates as the reference line. In the embodiment of the present invention, the marking line detection ECU 20 includes a marking line correction unit that corrects the position of one of the vehicle's marking line candidates. Based on the position of the vehicle's marking line candidate, which is used as the reference line, in the image information, the marking line detection system 1 uses the marking line correction unit to correct the position of the other marking line candidate of the vehicle in the image information. The marking line correction unit will be described in detail later. The reference line mentioned here refers to one of the two vehicle's marking line candidates in the image information. The one of the two vehicle's marking line candidates is used as the reference when correcting the positional deviation of the other vehicle's marking line candidate from the actual marking line.

Figure 2:
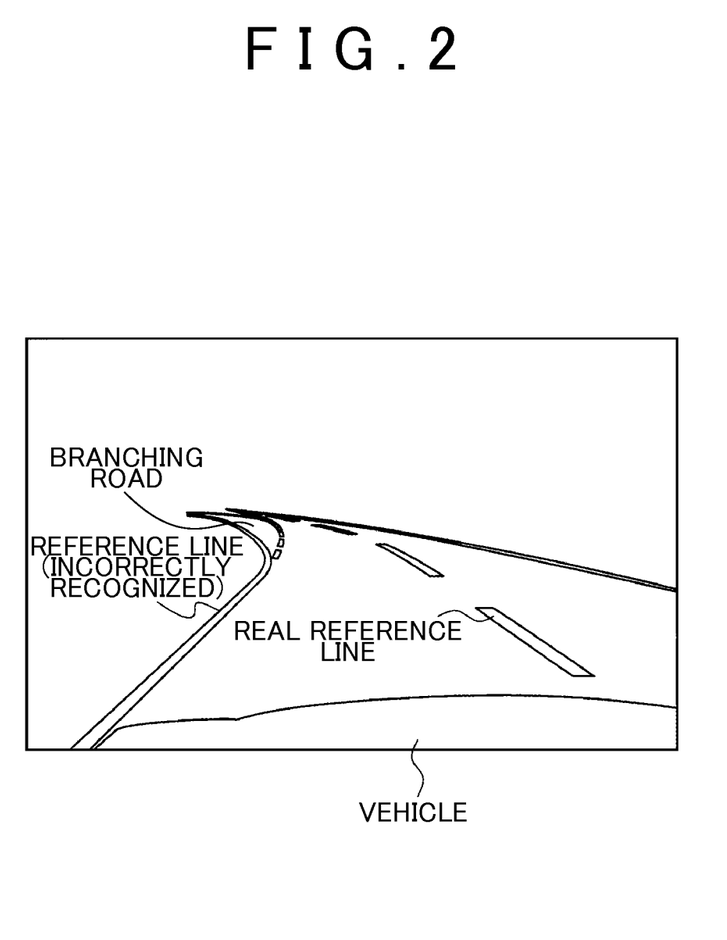
FIG. 2 is a diagram showing a correct reference line and an incorrect reference line.

When the driving lane of the vehicle in the main driving road is connected to a branching road as shown in FIG. 2, the marking line detection system in the related art incorrectly recognizes the marking line of the branching road as the reference line. In this case, there is a possibility that the correct position of a vehicle's marking line candidate, which should otherwise be recognized as the reference line, is deviated. Such a situation may occur, for example, when the marking line of the branching road is a solid line and, at the same time, the vehicle's marking line candidate, which should be recognized as the reference line, is a broken line or is scraped.

To address this problem, the marking line detection system 1 in this embodiment avoids the incorrect correction of a vehicle's marking line candidate by setting one of the vehicle's marking line candidates, to which the branching line of a branching road is not connected or is unlikely connected, as the reference line. That is, one of the vehicle's marking line candidates in the image information, which is the reference when correcting the positional deviation of the other vehicle's marking line candidate from the actual marking line, is used as the reference line. This vehicle's marking line candidate is a marking line to which the branching line of a branching road is not connected or is unlikely connected. The specific configuration is described below.

In the embodiment of the present invention, the marking line detection ECU 20 includes a center line determination unit that determines whether a vehicle's marking line candidate is a center line that is a candidate for the reference line. The center line determination unit determines whether there is a center line based on whether there are vehicle's marking line candidates on the right side and the left side of the vehicle, one for each, or there is the vehicle's marking line candidate only on one of the right side and the left side. The center line mentioned here is not limited to the center line that divides the road into the vehicle's driving lane and the opposite lane.

If there is a vehicle's marking line candidate only on one of the right side and the left side of the vehicle, the center line determination unit determines that there is not a center line that is a candidate for the reference line.

On the other hand, if there are vehicle's marking line candidates on the right side and the left side of the vehicle, one for each, the center line determination unit considers that each of the two vehicle's marking line candidates is a candidate for the center line. The center line determination unit identifies the center line from the center line candidates based on the line type and the position of the two center line candidates.

If a center line candidate is composed of continuous edge segments, the center line determination unit determines that the center line candidate is a solid line. If a center line candidate is an aggregate of edge segments that are spaced to each other in the traveling direction of the vehicle, the center line determination unit determines that the center line candidate is a broken line. In addition, the center line determination unit determines whether a center line candidate is a white line or a yellow line based on the brightness value information. When the image information is a monochrome image, it is possible to determine whether a center line candidate is a white line or a yellow line based on the brightness ratio. The center line determination unit determines the line type of a vehicle's marking line candidate, which is a center line candidate, as described above.

The position of a center line candidate refers to whether the center line candidate is on the right side or left side of the vehicle. As the position information, the position information already obtained when the vehicle's marking line candidate was detected may be used.

In addition, the center line determination unit may identify the center line considering the reliability of a center line candidate. The reliability refers to an index used to determine whether a center line candidate can be the center line. For example, even when a center line candidate is recognized as a broken line, a solid center line candidate may be recognized as a broken line due to a scrape in the solid line. For this reason, the center line determination unit uses the reliability to correctly determine the center line. For example, the center line determination unit may calculate the reliability of the edge segments based on the length of each segment, or the interval between the edge segments, in a center line candidate to determine whether the center line candidate is a broken line.

Figure 3:
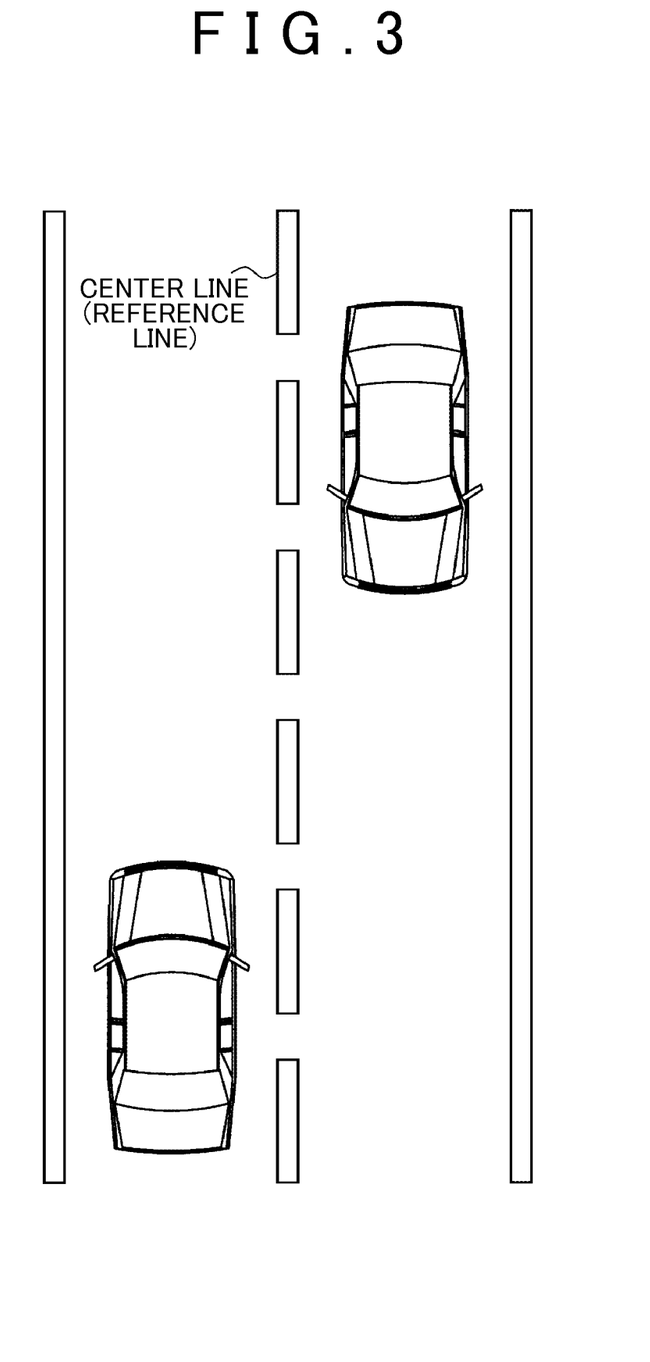
FIG. 3 is a diagram showing an example of a center line.
Figure 4:
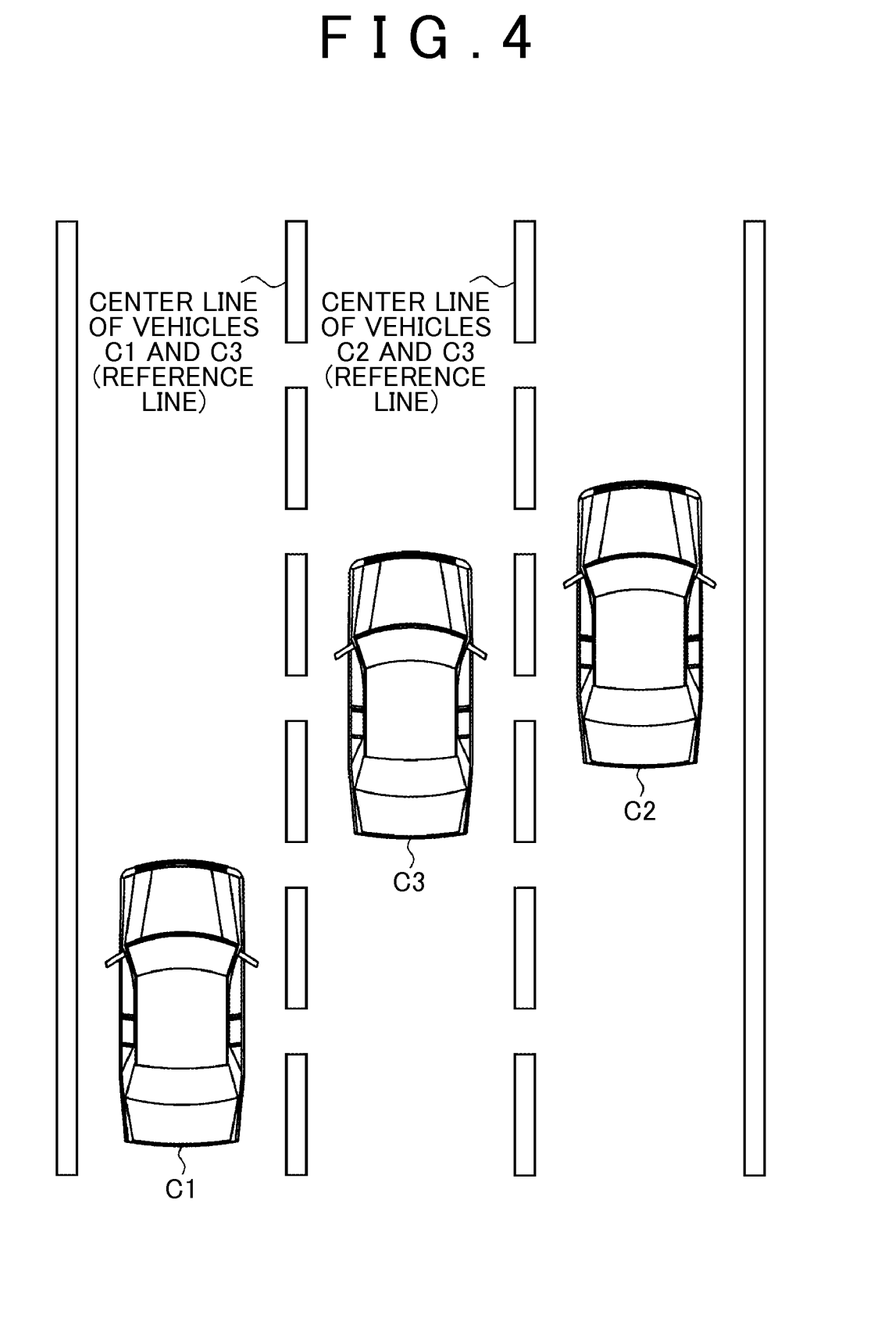
FIG. 4 is a diagram showing an example of a center line.
Figure 5:
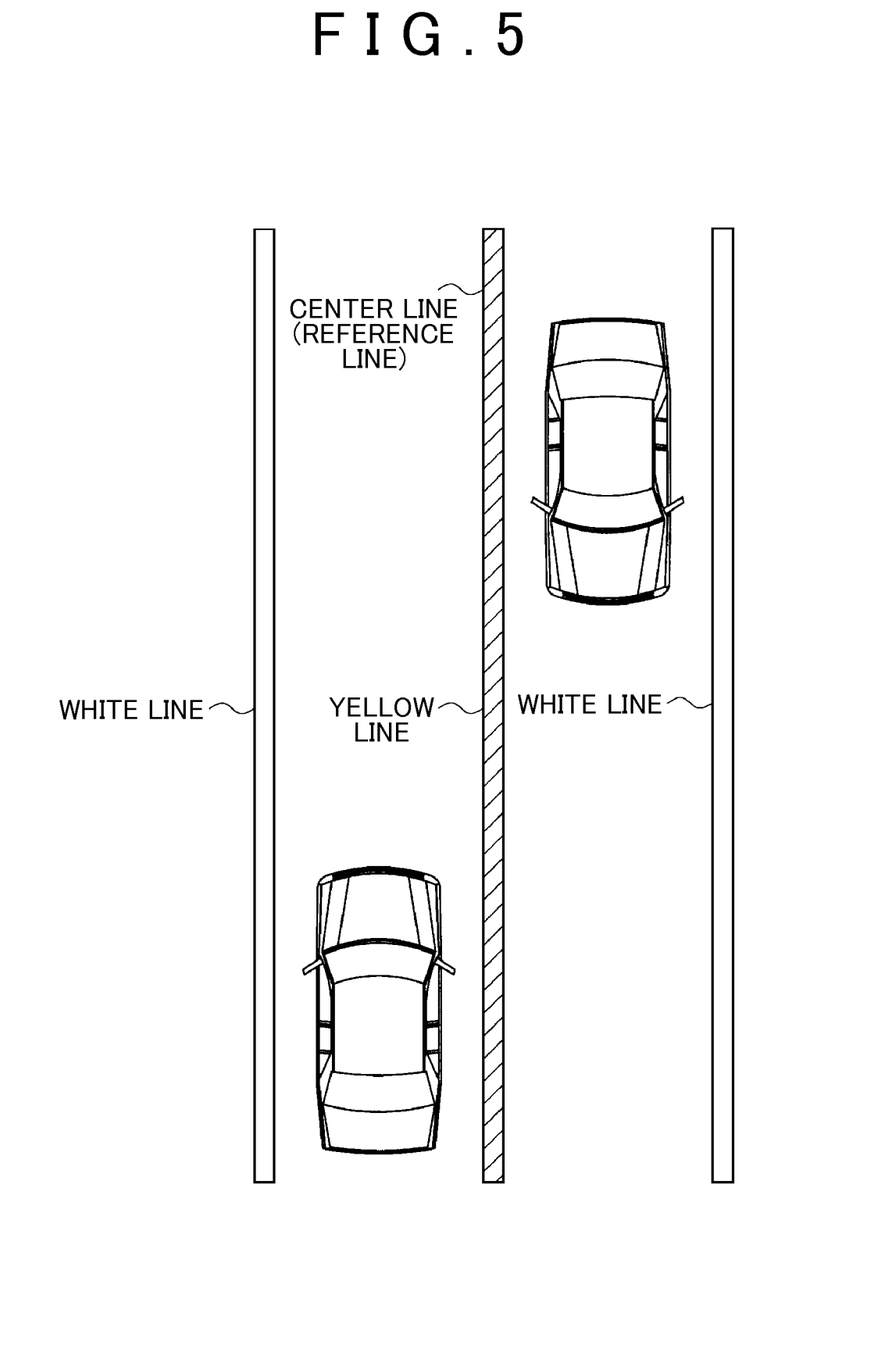
FIG. 5 is a diagram showing an example of a center line.

More specifically, if one of the center line candidates is a solid line and the other is a broken line, the center line determination unit identifies the broken-line center line candidate as a center line. For example, when the vehicle is traveling on a road with one lane in each direction where the vehicle must cross the center line when passing other vehicles as shown in FIG. 3, it is likely that there is a branching road on the solid-line center line candidate side than on the broken-line center line candidate side. In addition, when the vehicle is traveling on a road with multiple lanes in each direction as shown in FIG. 4, it is likely that there is a branching road on the solid-line center line candidate side than on the broken-line center line candidate side. FIG. 4 shows the center lines of vehicles C1 and C2 in the lanes at the both ends of a road with three lanes in each direction. In FIG. 4, the center line determination unit identifies the broken-line center lines as the center lines that are candidates for the reference line.

When both center line candidates are a broken line, the center line determination unit identifies each of the center line candidates as a center line. For example, when the vehicle is traveling in a lane, which is neither the rightmost lane nor the leftmost lane, on a road with three or more lanes in each direction, it is unlikely that there is a branching road on each of the center line candidate sides. FIG. 4 shows the center lines of vehicle C3 in the central lane on a road with three lanes in each direction. Therefore, the center line determination unit identifies both center line candidates as center lines each of which is a candidate for the reference line.

When one of the center line candidates is a white solid line and the other is a yellow solid line, the center line determination unit identifies the yellow solid center line candidate as a center line. For example, when the vehicle is traveling in a no-passing road shown in FIG. 5, it is more likely that there is a branching road on the white solid-line center line candidate side than on the yellow solid-line center line candidate side. Therefore, the center line determination unit identifies the yellow solid-line center line candidate as a center line that is a candidate for the reference line.

Figure 6:
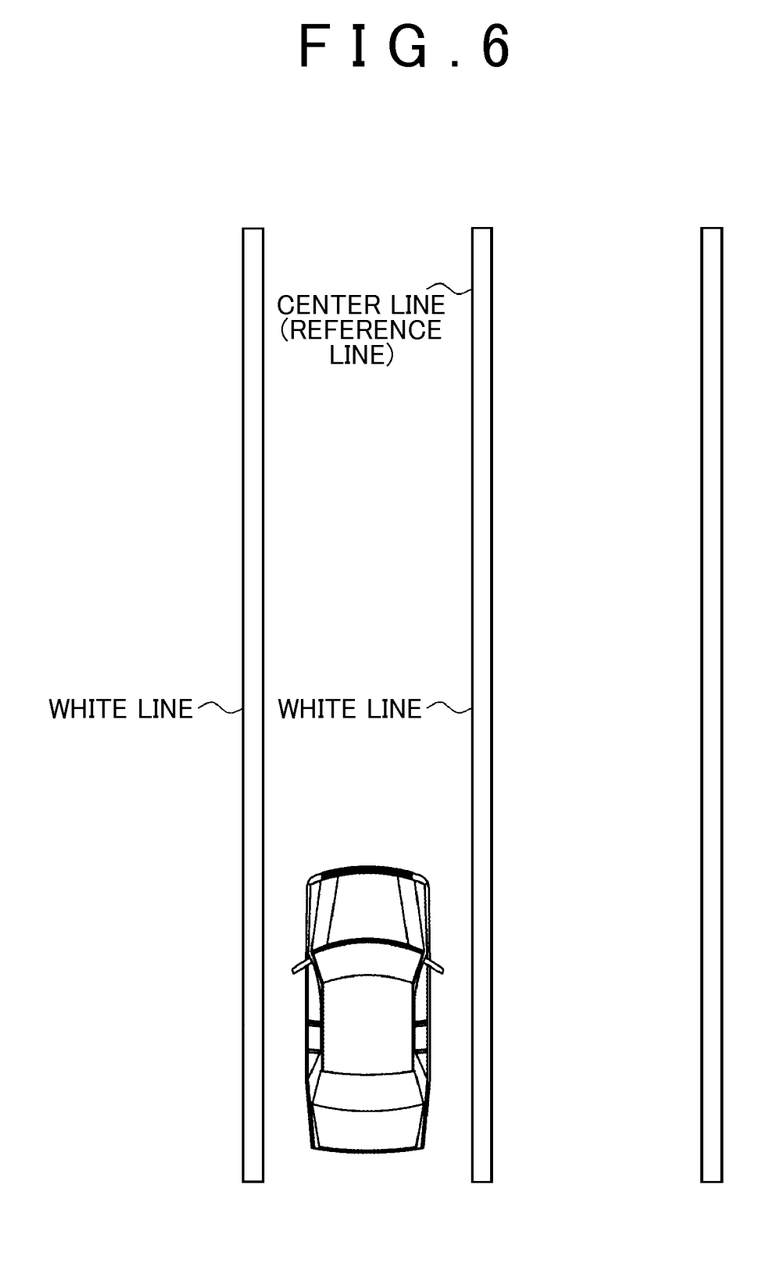
FIG. 6 is a diagram showing an example of a center line.
Figure 7:
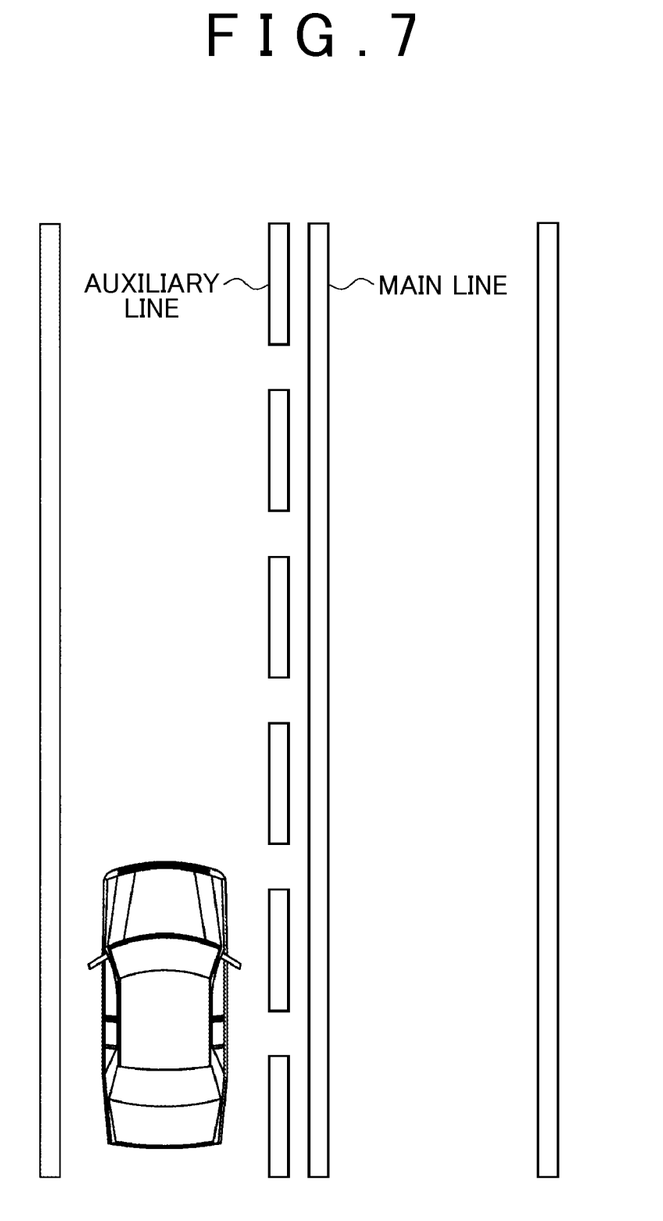
FIG. 7 is a diagram showing a compound line.

When both center line candidates are a white solid line, the center line determination unit determines whether there is a marking line candidate further outside of each of the center line candidates when viewed from the vehicle. FIG. 6 shows a case in which the center line candidates on both sides of the vehicle are a white solid line. If there is no marking line candidate further outside of a center line candidate in the lane shown in FIG. 6, it is likely that there is a branching road on this center line candidate side. On the other hand, if there is another marking line candidate outside of a center line candidate, it is unlikely that there is a branching road on this center line candidate side. Therefore, if there is another marking line candidate outside of one of the center line candidates, the center line determination unit identifies a center line candidate, outside of which there is another marking line candidate, as a center line that is a candidate for the reference line. On the other hand, if there is another marking line candidate outside of both center line candidates, the center line determination unit identifies both center line candidates as a center line that is a candidate for the reference line.

If a compound line (FIG. 7), composed of two lines of different line types, is a center line candidate, the center line determination unit determines whether this center line candidate is a center line or the opposite-side center line candidate is a center line based, not on the type of the auxiliary line, but on the type of the main line. In the embodiment of the present invention, a solid line is regarded as the main line with a broken line as the auxiliary line. The auxiliary line and the main line may be defined as necessary according to the law of each country.

The center line, identified by the center line determination unit, is less likely connected to the branching line of a branching road than the vehicle's marking line candidate that is on the other side and is a center line candidate. However, in such a case when the number of lanes is reduced and, as a result, there is no neighboring lane of the vehicle, there is a possibility that the branching line of a branching road is connected to the center line on the opposite side. To address such a situation, the marking line detection ECU 20 in the embodiment of the present invention includes a validity determination unit that determines whether the identified center line is a valid center line. The validity determination unit determines whether the identified center line is a center line that is valid as the reference line. A center line, which is valid as the reference line, refers to a center line to which the branching line of a branching road, which branches off from the driving lane of the vehicle, is not connected or a center line to which such a branching line is less likely connected. It is difficult to determine whether a branching line is likely or less likely connected to a center line. Therefore, if it cannot be definitively determined that a branching line is connected to a center line, the validity determination unit may determine that the center line is a valid center line to which a branching line is less likely connected. Similarly, if it can be determined a little bit that a branching line is likely connected to a center line, the validity determination unit is allowed not to determine that the center line is a valid center line to which the branching line is less likely connected.

If the center line determination unit has identified a vehicle's marking line candidate as a center line, the validity determination unit determines whether the identified center line is a valid center line.

More specifically, the validity determination unit determines, in the vehicle's traveling direction, whether there is a branching road that branches off from the side of the vehicle's marking line candidate that is identified as a center line. This determination is performed for the center line that appears in the image information. If there is no branching road that branches off from the side of the vehicle's marking line candidate that is identified as a center line, the validity determination unit determines that the center line is valid as the reference line and, therefore, the center line is a valid center line. On the other hand, if there is a branching road that branches off from the side of the vehicle's marking line candidate that is identified as a center line, the validity determination unit determines that the center line is not valid as the reference line and, therefore, the center line is not valid as the reference line. Whether there is such a branching road can be determined based on a change in the number of marking line candidates that are connected to the vehicle's marking line candidate determined as a center line in the image information.

If it can be estimated that, as the vehicle goes on traveling, there is a branching road that is outside the frame of the image information and is connected to the vehicle's marking line candidate that is a center line, the validity determination unit may determine that the vehicle's marking line candidate is not a center line. That is, in the case described above, the validity determination unit may determine that the identification of the center line is invalid. The estimation described above may be made based on the vehicle's position information from the car navigation system and the map information. It is preferable that a distant area not be specified for an area for which the estimation is made for the presence of a branching road that is connected, as the vehicle goes on traveling, to the vehicle's marking line candidate determined as a center line. This is because, if the vehicle's marking line candidate is connected to a branch road in the distance, the marking line can be corrected accurately even if the center line is used as a valid center line (reference line) at this point in time. For this reason, it is desirable that the area, for which the estimation is made, be limited to a near area at which the marking line can be corrected accurately or at which the vehicle will arrive in a short time.

The marking line correction unit sets the valid center line (vehicle's marking line candidate), which is determined as valid as described above, as the reference line and, based on the position of this valid center line, corrects the position of the other vehicle's marking line candidate that is not a valid center line. The position of the other vehicle's marking line candidate is corrected by a method known in this technical field. The marking line correction unit is divided into a shape estimation unit and a constraint condition calculation unit that are described below.

In correcting the position of a vehicle's marking line candidate, the shape estimation unit estimates the parameters for the vehicle's marking line candidate that is a valid center line (reference line). The parameters for the vehicle's marking line candidate refers to the shape information such as the curvature, the rate of change in the curvature, and so on. The parameters for the vehicle's marking line candidate are estimated by a method known in this technical field. For example, the shape estimation unit estimates the parameters for the vehicle's marking line candidate by performing model fitting for the group of edge points that configure the vehicle's marking line candidate that is a valid center line (reference line). Any model that can estimate the parameters may be used.

In correcting the position of a vehicle's marking line candidate, the constraint condition calculation unit calculates a correction constraint condition for the vehicle's marking line candidate to be corrected. The correction constraint condition, which is known in this technical field, is calculated based on the parameters for the vehicle's marking line candidate that is a valid center line (reference line). One example of the correction constraint condition is a condition for preventing the parameters (curvature, the rate of change in curvature, etc.) for the vehicle's marking line candidate to be corrected from exceeding a predetermined error level. Another example of the correction constraint condition is applicable when the vehicle is performing lane departure prevention support control or lane keeping support control. This another correction constraint condition may be a condition for preventing an error in the yaw angle of the vehicle or an error in the amount of offset (horizontal position) between the vehicle and the vehicle's marking line candidate from exceeding a predetermined error level.

More specifically, when it is determined that the center line is a valid center line, the shape estimation unit estimates the parameters for the valid center line (vehicle's marking line candidate). After that, based on the estimated parameters for the valid center line, the constraint condition calculation unit calculates the correction constraint condition for the vehicle's other marking line candidate that is not a valid center line (vehicle's marking line candidate on the laterally opposite side of the valid center line with respect to the vehicle). The shape estimation unit estimates the parameters (shape information) for the vehicle's other marking line candidate that is not a valid center line so that the correction constraint condition is satisfied while considering the parallelism with the valid center line (vehicle's marking line candidate). This corrects the position of the vehicle's other marking line candidate with the result that the corrected marking line candidate is detected as the marking line of the vehicle. For example, the output unit of the marking line detection ECU 20 projects the vehicle's other marking line, which is not a valid center line, onto the image information based on the parameters for the vehicle's other marking line candidate. Because the valid center line (vehicle's marking line candidate) is also detected as the vehicle's marking line at that time, the output unit projects the vehicle's marking line onto the image information based on the parameters for the valid center line.

On the other hand, when it is determined that the center line is not a valid center line, the validity determination unit sets the vehicle's other marking line candidate (vehicle's marking line candidate on the laterally opposite side of the center line with respect to the vehicle), which is the other center line, as the reference line. That is, in this case, the position of the vehicle's other marking line candidate, which is the other center line, is not corrected based on the position of the center line (center line that is determined as not valid). It is also possible to add a reference line setting unit, which sets the reference line, to the marking line detection ECU 20 so that the reference line setting unit sets the reference line. Furthermore, the validity determination unit may be thought of as a unit for setting a center line as the reference line. This means that the validity determination unit and the reference line setting unit may be integrated into one unit. In this case, the shape estimation unit estimates the parameters for the vehicle's other marking line candidate that is not the center line. In addition, the constraint condition calculation unit calculates the correction constraint condition for the vehicle's marking line candidate that is identified as the center line based on the parameters for the vehicle's other marking line candidate. The shape estimation unit estimates the parameters (shape information) for the vehicle's marking line candidate that is identified as the center line so that the correction constraint condition is satisfied while considering the parallelism with the vehicle's other marking line candidate that is not a center line. This corrects the position of the vehicle's marking line candidate, which is identified as the center line, with the result that the marking line candidate is detected as the marking line of the vehicle. For example, the output unit projects the vehicle's marking line onto the image information based on the parameters for the vehicle's marking line candidate identified as the center line. In that case, the vehicle' other marking line candidate, which is not the center line, is also detected as the vehicle's marking line. Therefore, the output unit projects the vehicle's marking line onto the image information based on the parameters for the vehicle's other marking line candidate.

If it is determined that there is no center line, the shape estimation unit estimates the parameters (shape information) for the vehicle's other marking line candidate that is not the center line.

If the both are identified as the center line, one of the two vehicle's marking line candidates is set as the reference line based, for example, on the reliability.

Figure 8:
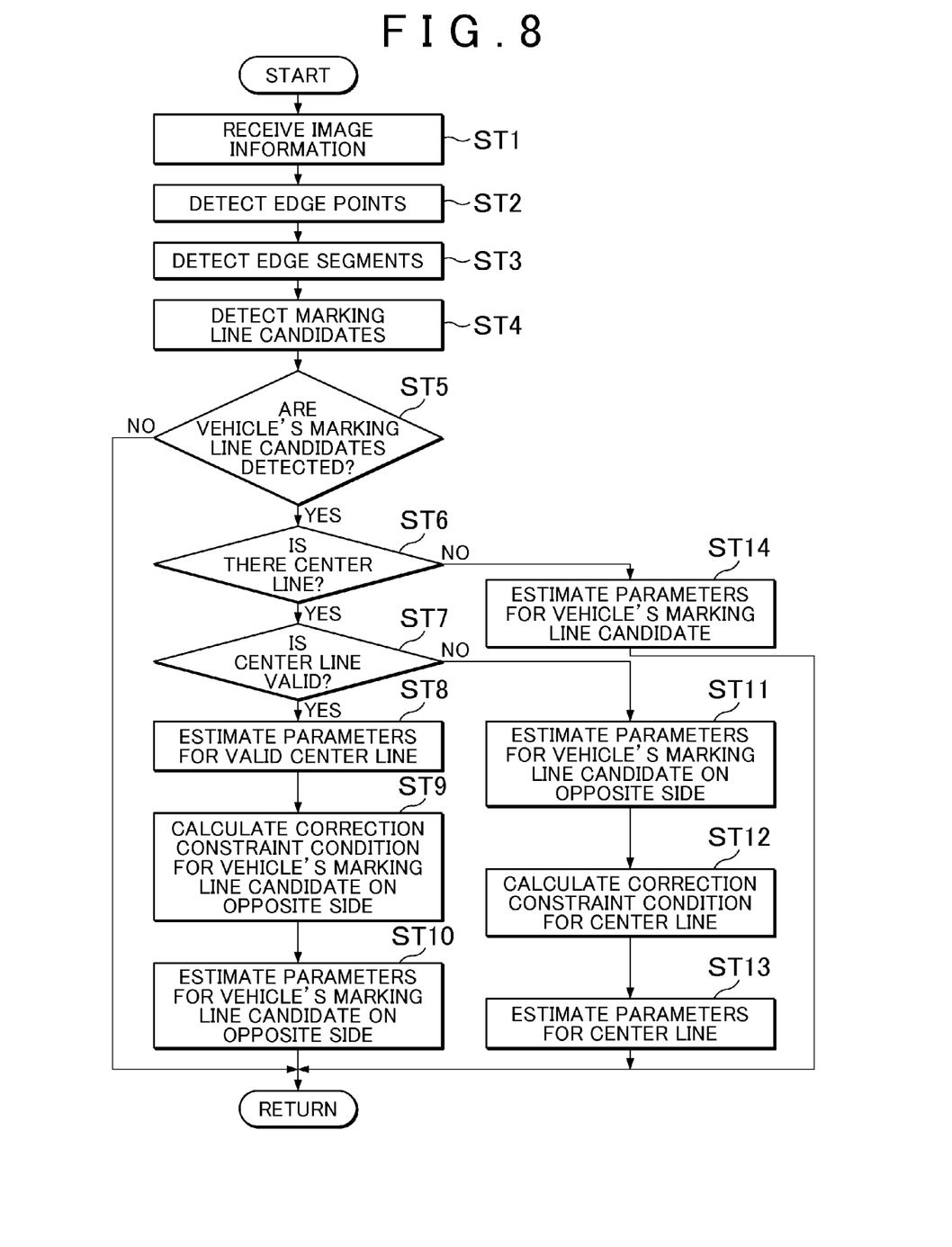
FIG. 8 is a flowchart showing an example of the arithmetic processing operation of the marking line detection system in the embodiment of the present invention.

An example of the arithmetic processing of the marking line detection ECU 20 is described below with reference to the flowchart in FIG. 8.

The marking line detection ECU 20 receives the image information in the imaging area captured by the imaging device 10 (step ST1).

The edge point detection unit detects first edge points and second edge points in the image information (step ST2). As described above, the first edge points and the second edge points, which are thought of as the edge points of a marking line in the image information, are detected based on the brightness value information extracted by the information extraction unit. At this time, unnecessary edge points, such as a noise, are removed by the comparison between the edge strength and the threshold or by the pairing of edge points.

The edge segment detection unit detects first edge segments and second edge segments as described above based on all first edge points and second edge points (step ST3). At this time, pairs are formed among the first edge segments and the second edge segments as described above.

The marking line candidate detection unit detects the marking line candidates in the image information based on the paired first edge segments and the second edge segments (step ST4).

The marking line correction unit determines whether vehicle's marking line candidates are detected from the marking line candidates (step ST5).

If the vehicle's marking line candidates are not detected, the marking lines need not be corrected. Therefore, if the vehicle's marking line candidates are not detected, the marking line correction unit once terminates the arithmetic processing.

On the other hand, if vehicle's marking line candidates are detected, the marking line correction unit passes the processing to the center line determination unit. The center line determination unit determines whether there is a center line by determining whether any of the detected vehicle's marking line candidates is a center line that is a candidate for the reference line as described above (step ST6). If there is a vehicle's marking line candidate only on one of the right side and the left side of the vehicle, the center line determination unit determines that there is not a center line that is a candidate for the reference line as described above. On the other hand, if there are vehicle's marking line candidates on the right side and the left side of the vehicle, one for each, the center line determination unit determines each of the two vehicle's marking line candidates as a candidate for the center line and identifies the center line from the center line candidates.

If the center line is detected, the validity determination unit determines whether the detected center line is valid as the reference line (step ST7). That is, in step ST7, the validity determination unit determines whether the detected center line is a valid center line. Whether the detected center line is valid is performed as described above.

If the center line is valid as the reference line, the shape estimation unit estimates the parameters (shape information) for the valid center line (vehicle's marking line candidate) (step ST8). Furthermore, based on the parameters for the valid center line, the constraint condition calculation unit calculates the correction constraint condition for the vehicle's other marking line candidate that is not the valid center line (vehicle's marking line candidate on the laterally opposite side of the valid center line with respect to the vehicle) (step ST9).

The shape estimation unit estimates the parameters (shape information) for the vehicle's marking line candidate on the opposite side of the valid center line so that the correction constraint condition is satisfied while considering the parallelism with the valid center line (vehicle's marking line candidate) (step ST10). Therefore, even if the valid center line (vehicle's marking line candidate) is a broken line or is scraped, the configuration of the marking line detection system 1 prevents the branching line of a branching road from being selected as the reference line, allowing the position (that is, shape) of the vehicle's marking line candidate on the opposite side to be corrected with the valid center line as the reference line.

On the other hand, if the center line is not valid as the reference line, the shape estimation unit estimates the parameters (shape information) for the vehicle's other marking line candidate (vehicle's marking line candidate on the laterally opposite side of the center line with respect to the vehicle) that is not the center line (step ST11). That is, in this case, the reference line is replaced by the vehicle's marking line candidate on the opposite side of the center line. The constraint condition calculation unit calculates the correction constraint condition for the center line (vehicle's marking line candidate) based on the parameters for the vehicle's other marking line candidate (step ST12).

The shape estimation unit estimates the parameters (shape information) for the center line (vehicle's marking line candidate) so that the correction constraint condition is satisfied while considering the parallelism with the vehicle's marking line candidate on the opposite side of the center line (step ST13). Therefore, even if the vehicle's marking line candidate on the opposite side of the center line is a broken line or is scraped, the configuration of the marking line detection system 1 prevents the branching line of a branching road, connected to the center line, from being selected as the reference line, allowing the position (that is, shape) of the center line to be corrected with the vehicle's marking line candidate on the opposite side as the reference line.

If a center line is not detected, the shape estimation unit estimates the parameters (shape information) for the vehicle's marking line candidate that is present in one of the right side or the left side of the vehicle (step ST14).

As described above, a vehicle's marking line candidate is not corrected based on the branching line of a branching road in the marking line detection system 1. Therefore, the marking line detection system 1 can correctly detect the marking lines of the vehicle's driving lane.

What is claimed is:

1. A marking line detection system comprising:
   a camera device that is configured to capture surroundings of a vehicle;
   an electronic controller comprising:
   a marking line candidate detection unit that is configured to detect marking line candidates based on image information in an imaging area captured by the imaging device and that is configured to, based on the marking line candidates, detect marking line candidates for a driving lane of the vehicle as vehicle's marking line candidates, the vehicle's marking line candidates including a first vehicle's marking line candidate and a second vehicle's marking line candidate;
   a marking line correction unit that is configured to correct a position of the second vehicle's marking line candidate based on a position of the first vehicle's marking line candidate, the vehicle being positioned between the first vehicle's marking line candidate and the second vehicle's marking line candidate;
   a center line determination unit that is configured to determine whether the first vehicle's marking line candidate is a candidate for a reference line; and
   a validity determination unit that is configured to, when the first vehicle's marking line candidate is determined as a candidate for the reference line by the center line determination unit, determine whether the first vehicle's marking line candidate is valid as the reference line, wherein
   the validity determination unit determines that the first vehicle's marking line candidate is valid as the reference line when the first vehicle's marking line candidate is not connected to a branching line of a branching road,
   the marking line correction unit is configured to, when the first vehicle's marking line candidate is determined to be valid as the reference line by the validity determination unit, perform a correction of the position of the second vehicle's marking line candidate based on the position of the first vehicle's marking line candidate, and
   the marking line correction unit is configured not to, when the first vehicle's marking line candidate is determined not to be valid as the reference line by the validity determination unit, perform the correction based on the position of the first vehicle's marking line candidate.

2. The marking line detection system according to claim 1, wherein
   the marking line correction unit is configured to, when the first vehicle's marking line candidate is determined not to be valid as the reference line by the validity determination unit, correct the position of the first vehicle's marking line candidate based on the position of the second vehicle's marking line candidate.

* * * * *